June 20, 1967 G. B. VAN ATTA 3,326,594
CAMPING BODY FOR MOTOR VEHICLES
Filed Nov. 30, 1964 3 Sheets-Sheet 1
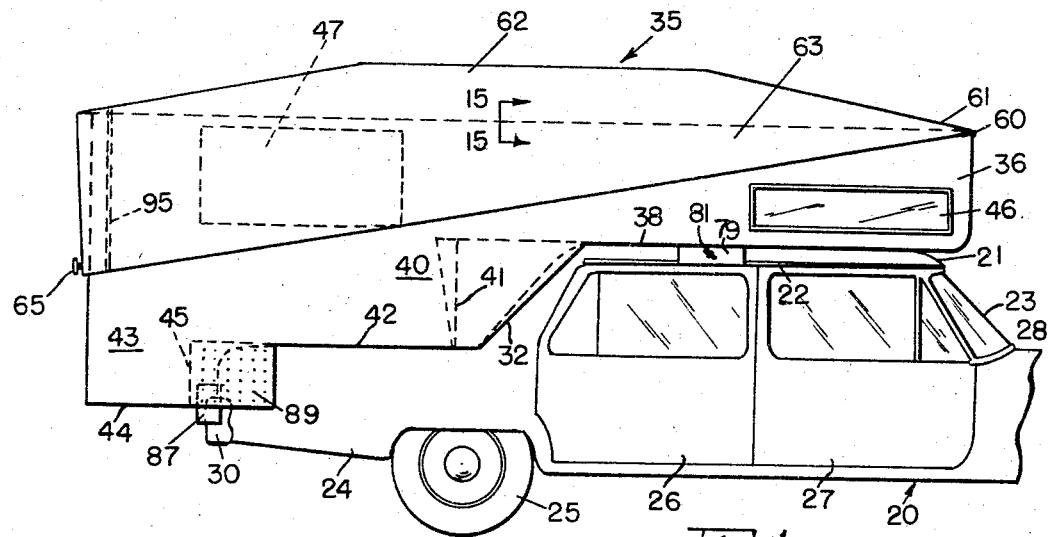
Fig.1
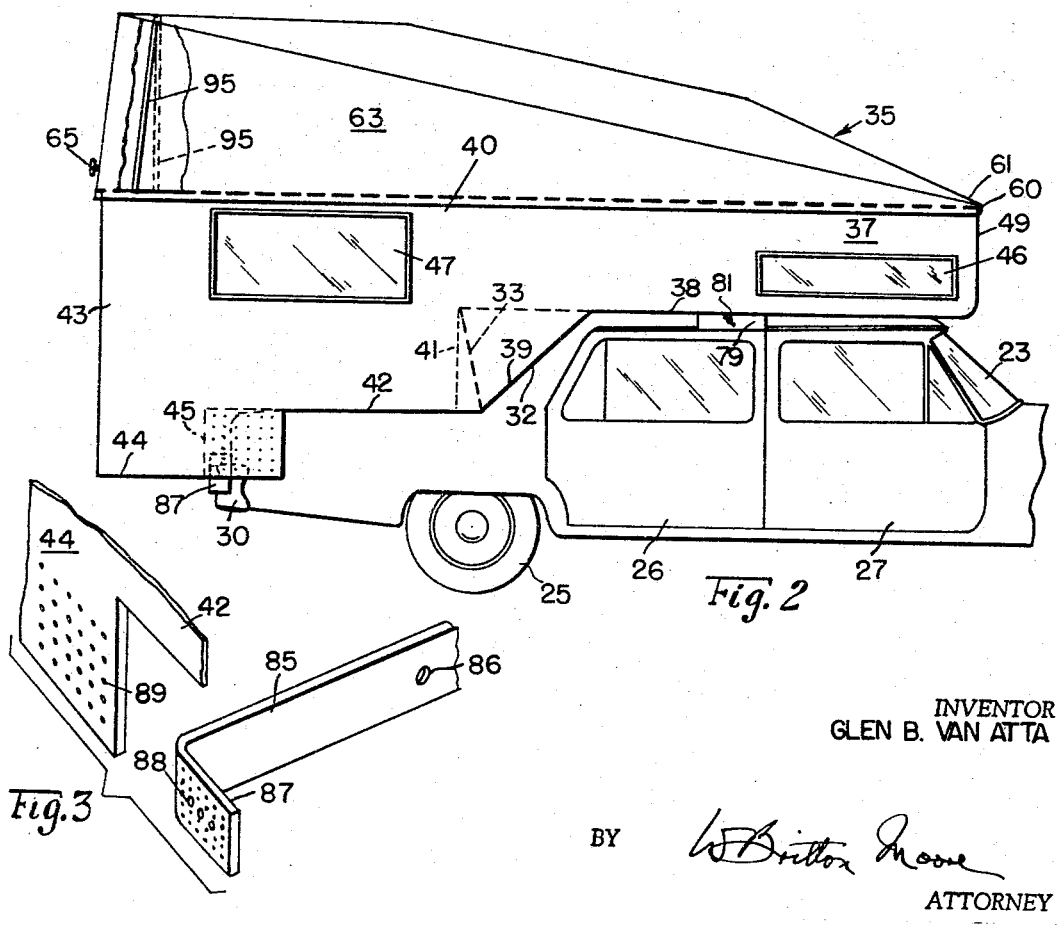
Fig. 2
Fig. 3
INVENTOR
GLEN B. VAN ATTA
BY W. Britton Moore
ATTORNEY June 20, 1967   G. B. VAN ATTA   3,326,594
CAMPING BODY FOR MOTOR VEHICLES
Filed Nov. 30, 1964   3 Sheets-Sheet 2
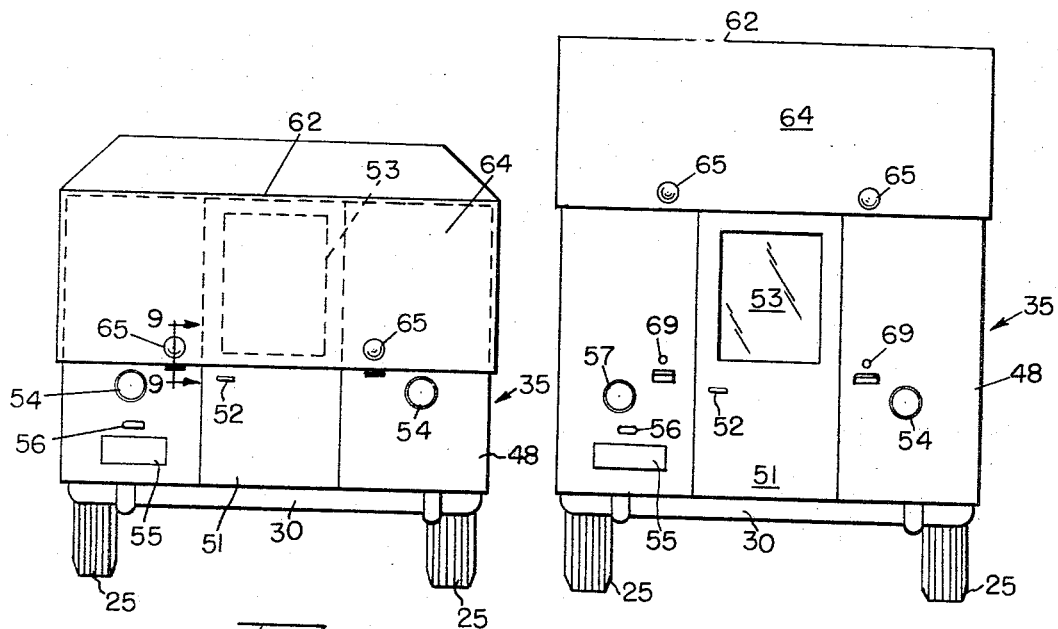
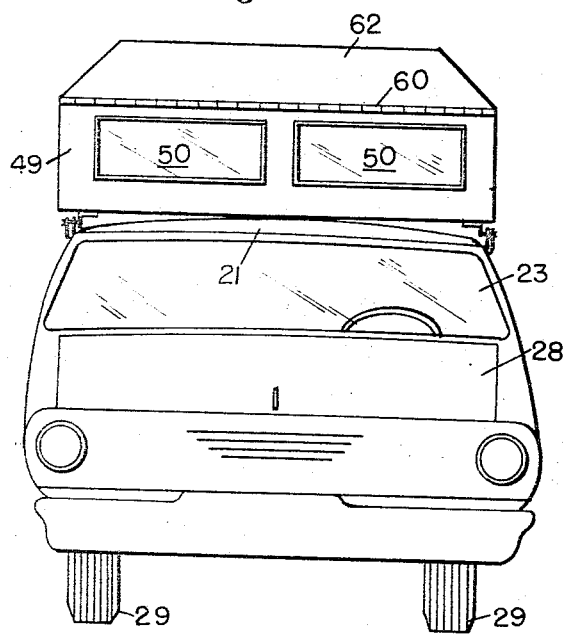
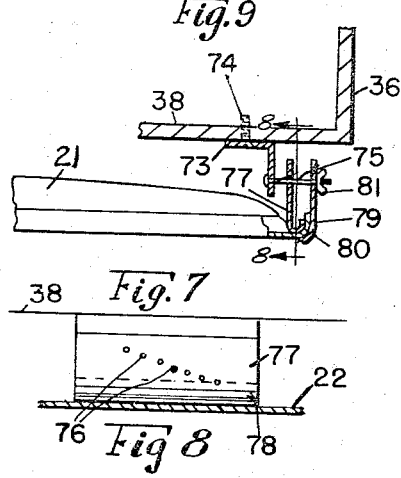
INVENTOR
GLEN B. VAN ATTA
BY *W. Britton Moore*
ATTORNEY June 20, 1967  G. B. VAN ATTA  3,326,594
CAMPING BODY FOR MOTOR VEHICLES
Filed Nov. 30, 1964  3 Sheets-Sheet 3
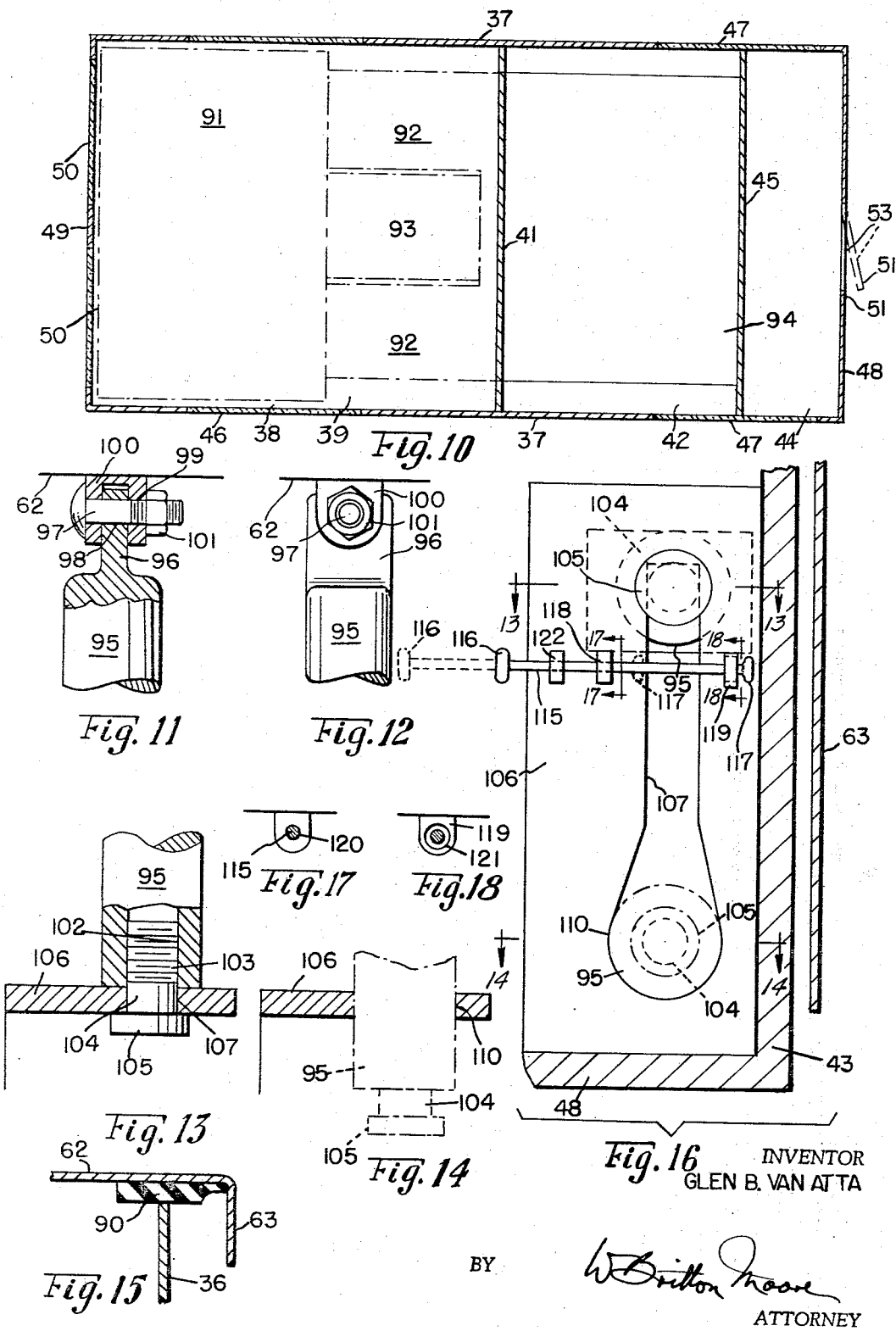

United States Patent Office 3,326,594
Patented June 20, 1967

3,326,594
CAMPING BODY FOR MOTOR VEHICLES
Glen B. Van Atta, 900 E. Franklin St.,
Kenton, Ohio 43326
Filed Nov. 30, 1964, Ser. No. 414,580
8 Claims. (Cl. 296—23)

This invention relates to a camping body for motor vehicles, and has as its primary object the provision of a camper body which may be attached to any standard motor vehicle with a minimum of effort and difficulty.

An additional object of the invention is the provision of a camper body of this character which is hinged adjacent its forward end at the top, to permit the top of the camper to be elevated at the rear to provide additional head room, and lowered when traveling, to reduce wind resistance and permit the car and its associated camper to travel beneath relatively low overhead obstacles.

An additional object of the invention is the provision of a camper of this character wherein the hinged top includes side sections which telescope over the body sides when the top is lowered.

A still further object of the invention is the provision of a device of this character wherein the rear of the camper overhangs the rear of the body of the transporting vehicle, thus obviating the necessity for steps or other accessories in entering the camper from the rear.

Still another object of the invention is the provision of a camper of this character provided with adjustable means whereby the same may be adapted to be transported by any conventional motor vehicle.

Still another object of the invention is the provision of improved adjusting means whereby the hinged top may be raised and lowered with a minimum of effort and difficulty.

A further and more specific object of the invention resides in the provision of an improved and simplified means for attaching the camper to a vehicle body, whereby the same may be mounted on or removed from a vehicle with a minimum of time, effort and difficulty.

Still other objects reside in the combinations of elements, arrangements of parts, and features of construction, and will in part be pointed out as the description of the invention proceeds, and shown in the accompanying drawings wherein:

FIGURE 1 is a side elevational view of the camper of the instant invention mounted on a motor vehicle, parts of the latter being broken away, with the camper shown in closed position.

FIGURE 2 is a view similar to FIGURE 1 but showing the camper in open position, or ready for use.

FIGURE 3 is a fragmentary exploded perspective view showing the means of adjustably attaching the camper to the rear of the vehicle body.

FIGURE 4 is a rear elevational view with the body in the position shown in FIGURE 1.

FIGURE 5 is a rear elevational view with the body in the position shown in FIGURE 2.

FIGURE 6 is a front elevational view with the camper body in lowered or traveling position.

FIGURE 7 is a fragmentary view partially in section and partially in elevation showing certain elements employed in the connection of the camper body to the vehicle roof.

FIGURE 8 is a sectional view taken substantially along the line 8—8 of FIGURE 7 as viewed in the direction indicated by the arrows.

FIGURE 9 is a fragmentary enlarged sectional view taken substantially along the line 9—9 of FIGURE 4.

FIGURE 10 is a sectional view taken horizontally through the camper, showing the arrangement of the interior thereof.

FIGURE 11 is an enlarged end view partially in elevation and partially in section showing the mounting of one of the top supporting members.

FIGURE 12 is a side elevational view of the structure of FIGURE 11.

FIGURE 13 is a detailed sectional view showing the bottom of the rod of FIGURE 11, or taken substantially on the line 13—13 of FIGURE 16.

FIGURE 14 is a similar view to FIGURE 13 but showing the parts in a different positioin of adjustment, or taken substantially along the line 14—14 of FIGURE 16.

FIGURE 15 is a fragmentary sectional view of a constructional detail taken substantially along the line 15—15 of FIGURE 1, and, FIGURE 16 is a fragmentary plan view of a further constructional detail showing the means for securing the assembly in top raised position.

FIGURE 17 is a sectional view taken along the line 17—17 of FIGURE 16 as viewed in the direction of the arrows.

FIGURE 18 is a sectional view taken along the line 18—18 of FIGURE 16 as viewed in the direction of the arrows.

Similar reference characters refer to similar parts throughout the several views of the drawings.

Having reference now to the drawings in detail, there is generally indicated at 20 a motor vehicle of any standard sedan-type construction, which includes a top 21 having a rain gutter 22, the usual windshield 23 and rearwardly extending trunk 24. The other standard components of a vehicle include wheels 25, front and rear doors 26 and 27, a hood 28, front wheels 29 (see FIG. 6), and a rear bumper 30, all of any desired conventional construction. The roof 21 of the vehicle is provided with an inclined sloping rear portion 32. The dotted lines in FIGURES 1 and 2 indicate the inside framework for the table and cushions which make it into an extra bed.

The camper of the instant invention is generally indicated at 35, and includes a pair of opposite side walls 36. Each of the side walls 36 includes a relatively low front portion 37, which has a floor section 38, and which is connected by an inclined portion 39 to a relatively higher central portion 40. A vertical partition 41 interiorly of the camper body connects the floor 38 of the low portion with the floor 42 of the intermediate portion. To the rear of intermediate section 40 is a relatively high portion 43 having a floor 44 extending thereacross, below the rear of trunk 24 and at about the level of bumper 30. A vertical partition 45 connects the floor 44 with the floor 42. Front and rear side windows 46 and 47 are positioned in each of the side walls, while a rear wall 48 closes the space at the rear of the vehicle. A front wall 49 closes the space between the side walls at the forward end thereof, and is provided with front window portions 50. Rear wall 48 has a hinged door 51 therein, which is provided with the conventional lock and latch mechanism 52, as well as a window 53.

Rear wall 48 is provided exteriorly, as shown in FIGS. 4 and 5, with stop lights 54, a license plate holder 55, and a license illuminating light 56.

Extending entirely across the top of front portion 49 is an elongated hinge 60, to which is connected the forward edge 61 of a top 62. The top 62 includes elongated triangular side portions 63, which, with the camper in its closed or traveling position, telescope the adjacent side walls 36. The bases of these triangular portions are of sufficient extent to completely cover the rear side windows 47 when the top is in lowered or traveling position.

A rear panel 64 connects the bases of these triangular portions with the top 62, and when in closed position overlies the rear wall 48 and covers rear window 53.

Rear panel 64 is provided with a pair of lifting knobs 65, positioned on opposite sides thereof adjacent the lower edge, which facilitate the raising of the top to open or camping position.

When the top is lowered, knobs 65 also serve as securing means therefor. As best shown in FIG. 9, each knob 65 is carried by a shank 66 which passes through an opening 67 in panel 64, the shank 66 having a threaded end 68. The threaded ends 68 engage in threaded openings 69 in rear wall 48 when the camper is in closed position, and securely hold the top against dislodgement or bouncing. A stop pin or washer 70 prevents the knobs from falling out of the opening 67 when the top is in raised position, and a flange 71 secured beneath each opening 69 to rear wall 48 serves accurately to align the threaded ends 68 with the threaded openings 69.

Means are provided as shown in FIGURES 7 and 8 for securing the low or forward section of the camper to the vehicle top, and take the form of angle irons having horizontal flanges 73 which are bolted as by means of bolts 74 to the underside 38 of the low section of the camper. The angle irons also have depending vertical flanges which are apertured to receive bolts 75. The bolts also extend through slotted ones of an angularly disposed series of openings 76 in fastening plate 77. The lower edge of fastening plate 77 seats interiorly of the rain gutter 22 of the vehicle top. An outer clamping plate 79 is also provided having a lower arcuate portion 80 which encircles the outer arcuate edge of the rain gutter 22, and a wing nut 81 serves to secure the parts in related assembly. Bottom 38 of the low section is thus attached firmly to the roof of the vehicle at the rain gutter 22, but at the same time does not come in contact with the top of the vehicle 21, and therefore does not mar the finish.

FIGURE 3 discloses means for adjustably securing the rear or high section of the vehicle to the rear bumper 30, such means taking the form of a U-shaped bar 85 which is secured to the cross bar of a conventional trailer hitch by means of one bolt extending through bolt hole 86. Bar 85 has a right angled flange 87 at each end which extends vertically parallel to the sides of the vehicle and which is provided with a multiplicity of bolt holes 88. The lower front corners of camper body portion 43 are similarly provided with a multiplicity of bolt holes 89, which can be selectively aligned with the bolt holes 88, the portions containing the bolt holes 89 overlying the flanges 87 and overlying the rear corners of the trunk of the vehicle. Bolts (not shown) extended through any selected ones of aligned bolt holes 88 and 89 serve to permit a wide range of adjustment in securing the camper to a wide range of lengths of vehicle bodies, having a variety of heights of trunk and roof so that the camper may be maintained level at all times and securely affixed to the vehicle body.

As best shown in FIGURE 15, heavy rubber seals 90 extend about the peripheral underside of roof 62 and rest snugly against the tops of the side and rear walls of the vehicle, effectively sealing the roof when in closed position against the ingress of water or the like.

FIGURE 10 discloses an interior arrangement wherein the low section of the vehicle has its floor 38 covered by a mattress 91, the height of this section being adequate to permit comfortable sleeping. Cushions 92 are positioned on opposite sides of the back of the low section of the body, and may have a table 93 positioned therebetween. The floor 42 of the intermediate section overlying the vehicle trunk is provided with a trap or access door 94, by means of which access may be had to the trunk of the vehicle without unloading or removing the camper.

Means are also provided for holding the camper top in raised angled position, and take the form of aluminum or magnesium rods 95 which are positioned on opposite sides of the vehicle, and which include flattened upper ends 96 which are apertured to receive pivot bolts 97 which extend through openings 98 therein and aligned openings 99 in bifurcated brackets 100 which depend from the vehicle roof 62. Lock nuts 101 secure the parts in related assembly, so that the rods are freely swingable about the pivot points. The lower ends of the rods as shown in FIGURE 13 are hollow and interiorly threaded as at 102 to accommodate the threads 103 of the bolt having smooth shank 104 and an enlarged head 105. The bolt extends through a keyhole slot in a rectangular plate 106, which is positioned adjacent the top rear corner of the rear or high section of the vehicle. Obviously, there are plates 106 on each side of the vehicle for each rod.

As best shown in FIGURES 16, 17 and 18, the slot includes a narrow portion 107 which is of a width snugly to accommodate the shank 104 of the bolt, but which is of a width insufficient to permit passage of either the rod 95 or the head 105 of the bolts. The slot tapers to a wide arcuate portion 110, which is dimensioned to permit passage therethrough of a rod 95. The arrangement is thus such that when the rod is slidably moved along the plate to the position indicated in full lines in FIGURE 16, and locked in a manner to be more fully described hereinafter, the vehicle top is supported in its raised angled position, but when the rod is slid to the position indicated in dotted lines in FIGURE 16, it may extend downwardly through the large portion 110 of the slot to permit the lowering of the roof about hinge 60. The two positions of adjustment are shown in full and dotted lines in FIGURE 2, while the downwardly extending or depending position of the rods is indicated in dotted lines in FIGURE 1.

The locking mechanism provided for holding the rods in position to support the top comprises a slidable locking pin 115 having a head 116 at one end, and a stop knob 117 at its other end. The rod is linearly movable transversely of the length of the slot 107 through a pair of apertured lugs 118 and 119 mounted on the plate, the lug 118 having an opening 120 therethrough of a diameter sufficient only to accommodate the rod, while the lug 119 on the opposite side is provided with an opening 121 of a dimension sufficient to pass the knob 117 therethrough. An additional apertured guide lug 122 is also provided for holding the pin in alignment when it is moved to the release or dotted line position shown in FIGURE 16.

The use and operation of the device should now be readily apparent. With the components in the position of FIGURE 1, the device having been attached to the vehicle by means of bolts extended through the aligned openings 88 and 89 above described and the clamping bolts 75 and their associated wing nuts 81 extended through the selected openings in plates 77 and 79, the vehicle and its associated camper are ready to travel. In this position the top 62 is held in its lowered position by means of the threaded shanks 68 connected to knobs 65 and engaging in the threaded openings 69. When it is desired to occupy the camper, the knobs 65 are rotated to release position and utilized to lift roof 62 to the position shown in FIGURE 2. The rods 95 are shifted from the dotted line position of FIGURE 2, in which they pass upwardly through the enlarged portions of slots 110 in plates 106 to the position shown in full lines in FIGURE 2 wherein the shanks 104 engage the narrow portion 107 of the slot thus holding the top in raised position. The rods 95 are held in this position by means of the locking pin 115 which is moved from the dotted line position shown in FIGURE 16 to the full line position shown therein. Access may then be had to the interior of the camper through the door 51. When it is desired to move the vehicle, the roof is lowered to traveling position by reversing the procedure.

From the foregoing it will now be seen that there is herein provided an improved camper which may be readily attached to a wide variety of shapes and sizes and configurations of motor vehicles, which accomplishes all of the objects of this invention and others including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

What is claimed is:

1. A camping body for motor vehicles including a low section adapted to overlie and rest upon the top of the vehicle, an intermediate section adapted to overlie and rest upon the trunk of the vehicle, and a high section adapted to overhang the rear end of the vehicle and having a bottom extending close to ground level, said sections terminating at a uniform height, a hinge on the forward end of the low section, a roof pivoted on said hinge and swingable between a lowered flat position for traveling and a high angled position for camping, said roof extending over all of said sections and including means for supporting said roof in said high angled position, said means for supporting said roof in high angled position including supporting rods pivotally secured to the underside of said roof, said rods having reduced ends, shanks and enlarged heads, plates secured to the tops of the walls of said high section adjacent said rods, said plates having keyhole slots therein, through the enlarged portions of which the rods may slide, the reduced portions of the keyhole slots being dimensioned to receive said shanks and support said rods.

2. The structure of claim 1 including means for locking said supporting means in raised position.

3. The structure of claim 1 including means for securing said roof in lowered position.

4. The structure of claim 1 wherein said high section has a rear wall having a door therein.

5. The structure of claim 1 including means adapted adjustably to secure said low section to a vehicle top.

6. The structure of claim 5 including additional means adapted adjustably to secure said high section to the rear bumper of a vehicle.

7. The structure of claim 1 wherein locking means are provided for holding said shanks in the reduced portions of said slots.

8. The structure of claim 7 wherein said last mentioned means comprise pins slidably mounted on the under side of said plates, and extensible and retractable transversely across said slots.

References Cited

UNITED STATES PATENTS

| | | | |
|---|---|---|---|
| 1,984,681 | 12/1934 | Jackson | 135—4 |
| 2,614,882 | 10/1952 | Cook | 296—23 |
| 3,143,121 | 8/1964 | McKee | 296—23 |
| 3,146,018 | 8/1964 | Pearlman | 296—26 |
| 3,185,518 | 5/1965 | Zentner | 296—23 |
| 3,212,812 | 10/1965 | Kurtz. | |

BENJAMIN HERSH, *Primary Examiner.*

P. GOODMAN, *Assistant Examiner.*